United States Patent Office 3,184,623
Patented May 18, 1965

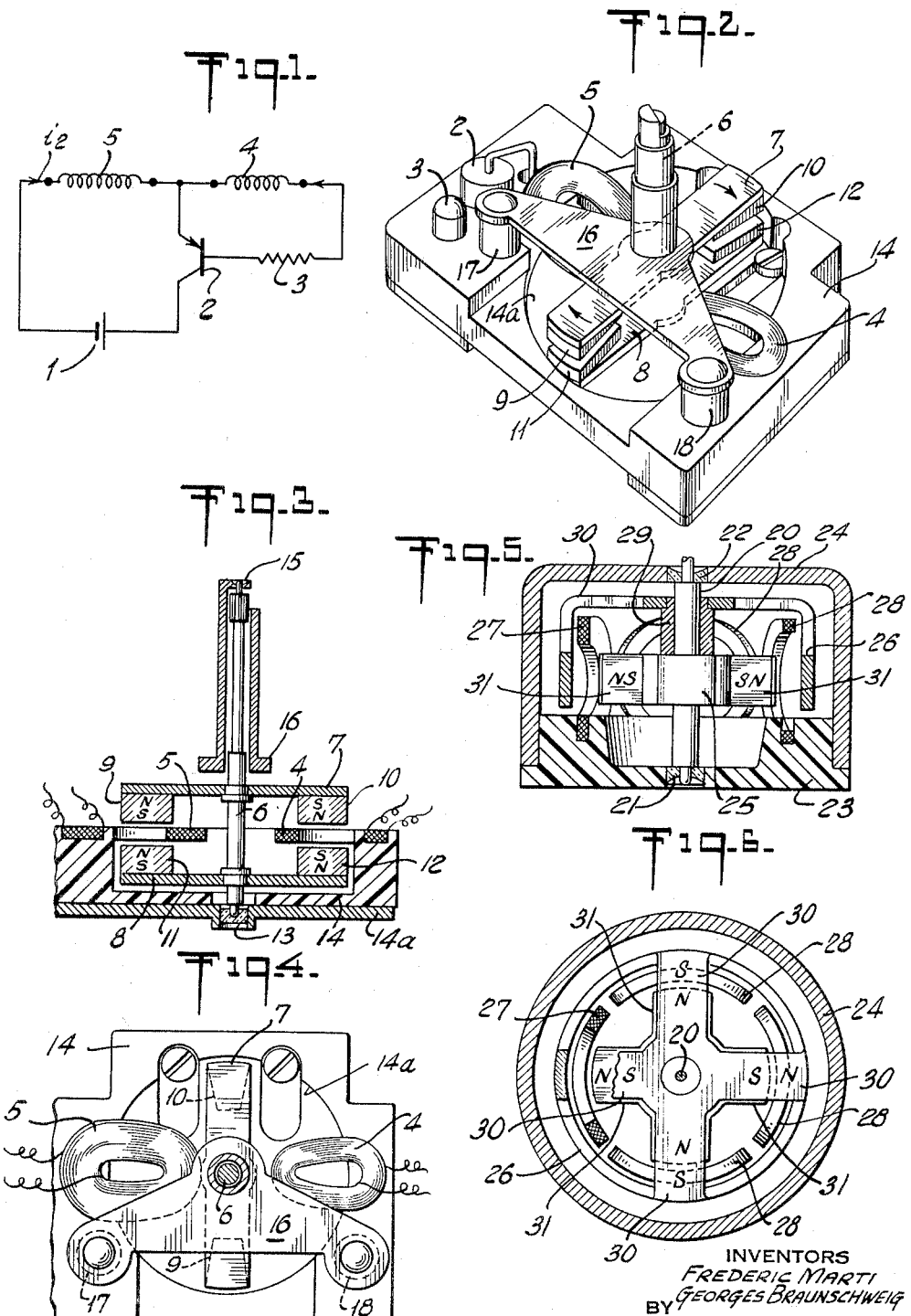

3,184,623
MINIATURE ELECTRIC MOTOR
Frederic Marti and Georges Braunschweig, both of 165 Rue Numa Droz, La Chaux-de-Fonds, Switzerland
Filed Sept. 19, 1960, Ser. No. 56,885
3 Claims. (Cl. 310—36)

This invention relates to an electric motor and more particularly to a motor of very small size.

This application is a continuation-in-part of co-pending application Serial No. 789,391, filed January 27, 1959, now U.S. Patent No. 2,981,054.

An object of this invention is to provide a small electric motor which nonetheless is efficient and rugged and which can run continuously for long periods.

Another object is to provide such a motor which can operate from a small flashlight battery, for example.

A further object is to provide a motor of this kind which is simple and inexpensive to manufacture.

These and other objects will in part be understood from and in part pointed out in the following description.

The usual kind of direct current motor includes a stator, a rotor and a device for reversing or interrupting the current, consisting in most cases of a mechanical commutator. In the case of micromotors which are designed to supply a very small mechanical power and which are fed by a weak source of low voltage current such as a flashlight battery or a photoelectric cell, a commutator has various drawbacks. These drawbacks, which are due primarily to the fact that the commutator acts by the mechanical closing of contacts are the following: uncertainty of intimate closing of the contact, alteration of the contacts due to corrosion, dust or wear, variations in voltage caused by changing contact resistance, mechanical friction, etc. Mechanical friction and the voltage drop at the contacts consume, in the case of micromotors, a large part of the energy supplied to the motor with the result that their efficiency heretofore has been low.

Furthermore, the life of the contacts used in a mechanical commutator is limited (about 1,000 hours in the case of micromotors).

In accordance with the invention, in one specific embodiment thereof, a unique motor construction is provided which permits the motor to be made small in size and yet to operate efficiently in a commutatorless electronic current supply circuit. The stator of the motor includes a frame on which are mounted two pancake-like electric coils, these coils lying in the same plane a short distance apart. Mounted for rotation on an axis at right angles to the plane of the coils is a rotor having a cross-arm which carries several small magnets. The latter are positioned to pass closely above and below the coils and in so doing to induce in each one an electric voltage. The coils, one of which is designated the main impulse or movement-sustaining coil, and the other a feedback or signal coil, are connected in circuit with a transistor amplifier. When a voltage, caused by rotation of the rotor, is induced in the signal coil this amplifier applies to the motion-sustaining coil a current of suitable phase and amplitude to apply a magnetic impulse to the rotor. Thus, the rotor is kept running at a desired speed. The structure of this motor permits it to be easily assembled from inexpensive parts. The complete motor including the transistor amplifier (but not the battery) is built on a small, compact frame and the motor is so efficient that, as mentioned in the aforesaid parent application, powered by a small flashlight battery it can drive a clock mechanism for about a year.

A better understanding of the invention together with a fuller appreciation of its many advantages will best be gained from a study of the following description given in connection with the accompanying drawings wherein:

FIGURE 1 is an electric circuit diagram showing the motor utilizing a winding connected to a transistor.

FIGURE 2 is a perspective view of one embodiment of the invention.

FIGURE 3 is a vertical section and FIGURE 4 is a plan view of the motor in FIGURE 2.

FIGURE 5 is a vertical section through a second embodiment of the micromotor; and FIGURE 6 is a plan view with portions in section of the motor in FIGURE 5.

The electric circuit shown in FIGURE 1 is that of the micromotor of FIGURES 2 to 4. It comprises a battery 1 which can be, for instance, a 1.5 volt flashlight cell, a transistor 2, a resistor 3, a signal coil 4 connected between the emitter and the base of the transistor 2 in series with resistor 3, and a coil 5, called the movement-sustaining coil, which is connected to the battery 1 and to the output of the transistor 2. The signal coil 4 and the sustaining coil 5 are windings without magnetizable material, which form the stator of the motor, the rotor of which as seen in FIGURES 2 and 3 consist of a shaft 6 bearing two parallel straight yokes 7 and 8 of soft, magnetizable material. Fastened on the ends of these yokes are permanent magnets 9, 10, 11, 12 of large coercive force (for example of more than 300 oersteds) polarized as indicated. The shaft 6 is pivoted on the one hand in a thrust bearing 13 sunk in a mounting plate 14a which forms the bottom of a frame 14 of molded synthetic insulating material, and on the other hand in a bearing 15 (FIGURE 3) fastened in a post and bridge member 16 screwed to the frame by legs 17 and 18 (FIGURES 2 and 4). The two yokes 7 and 8 are fastened to the shaft 6 above and below the coils 4 and 5. The latter are flat thin coils without magnetizable material and of generally oval shape. The common axis of symmetry of these coils are directed toward said axis while the sides are approximately radial (FIGURE 4). The signal coil 4 is narrower than the sustaining coil 5. The connections of these coils to the battery and transistor are not shown in FIGURES 2 and 4 and any suitable arrangement may be utilized.

The permanent magnets 9, 10, 11 and 12 are arranged in such a manner that when one side of one of the coils is between the magnets 9 and 11, the opposite side of the other coil is between the magnets 10 and 12. The coils 4 and 5 are fastened to the side walls of frame 14 by flanges (not shown).

The operation of the micromotor shown in FIGURES 2 to 4 is as follows. The rotor having been previously started (by any suitable means, not shown), regardless of in what direction, the permanent magnets for example magnets 10 and 12, induce in the signal coil 4 a voltage which is applied to the input of the transistor 2 through the resistor 3, having to give an optimum output of the motor and, depending on the magnetic coupling between the signal coil and the sustaining coil, for decreasing or suppressing the possible commencement of self-oscillation between these two coils. The voltage induced in signal coil 4 causes transistor 2 to become highly conductive and to apply to coil 5 a pulse of current $i_2$ from battery 1. The magnets 9 and 11 and the coil 5 are so polarized relative to each other that the current $i_2$ passing through the coil 5 produces, with the field present between the magnets 9 and 11, a force in the direction of rotation of the rotor and this therefore, sustains the rotor in its movement. When the magnets 10 and 12 pass over the opposite side of the signal coil 4, they induce into the latter a voltage in opposite direction but since in this direction of polarization the input circuit of the transistor 2 is practically blocked, no current $i_2$ can pass through the sustaining coil 5. The next pulse takes place when the magnets 9 and 11 reach the coil 4 and the magnets 10 and 12, coil 5. The cycle is repeated in accordance with the direction of rotation of the rotor.

In this construction the magnets constituting the source of magnetic voltage are concentrated as close as possible to the gap where this voltage is absorbed, so as to lose as little of the field as possible by the leakage lines which pass outside of the useful gap. Also, the two yokes are at the same magnetic potential so as not to lose useful field by lines of force which could be formed directly between the yokes, on both sides of the gap. The yokes, being of soft, magnetizable material and not being saturated by the magnetic flux, absorb practically no magnetic voltage. Since these yokes are at the same magnetic potential, one can fasten them to a shaft 6 of magnetic material without any danger of loss of useful flux through the shaft. The magnets 9, 10, 11 and 12 are polarized as indicated in FIGURE 3 and they are dimensioned in such a manner that they each supply the same magnetic voltage. The magnets 11 and 12 could be eliminated by doubling the length (and the magnetic voltage) of the magnets 9 and 10 or vice versa, while maintaining the yokes 7 and 8 at the same magnetic potential.

It is advisable to construct the coils 4 and 5 as flat as possible in order to obtain a small gap and a high magnetic induction. It is also advantageous to construct these coils without magnetizable material in order to avoid losses in energy due on the one hand to flux variations in the cores (not instance by hysteresis and eddy currents), and on the other hand to the increased friction in the bearings 13 and 15 which would result from magnetic attraction between the magnetizable material of the stator and the magnets of the rotor.

By giving the coils 4 and 5 the oval shape shown with their common axis of symmetry passing through the shaft 6, one obtains an induced voltage over the greater part of the length of each turn of the coil. Thus, for a given size of coils, their ohmic loss is reduced.

Optimum output is obtained by permitting the current $i_2$ to flow only when all of the turns of the sustaining coil 5 are entirely between two superimposed magnets 9 and 11, or 10 and 12, and are therefore, transversed by a maximum flux. In order to achieve this result it is advantageous to make the two center openings in coils narrower than the sustaining coil 5, so as to induce into the signal coil 4 a voltage which causes the transistor 2 to be turned on only in a position of the rotor in which the turns of coil 5 are cut by the maximum magnetic flux.

A second embodiment of the invention shown in FIGURES 5 and 6 has a shaft 20 pivoted in bearings 21 and 22 which are fastened in the bottom of a base 23 and in the bottom of a cylindrical cover 24 respectively. The shaft 20 bears two concentric, annular yokes 25 and 26. Vertically mounted in base 23 are four coils having the shape of annular segments. One of these coils 27 is a signal coil and the three other coils 28 are sustaining coils. The outer yoke 26 is supported by a hub 29 of non-magnetic material fastened to shaft 20 and connected to the yoke by four arms 30. The inner yoke 25 bears four permanent magnets 31 of alternately reversed polarity, as indicated in FIGURE 6.

The four coils 27 and 28 are of generally rectangular shape curved so as to fit the envelope of a cylinder; they have no core of magnetizable material.

Due to the fact that this motor comprises three sustaining coils for a single signal coil, and due to the concentric arrangement of the yokes and of the coils, this motor can achieve a greater power for a given space than the motor of FIGURES 2 to 4.

It is to be understood that in either embodiment one could reverse the arrangement of the magnets and of the coils, the magnets being made part of the stator and the coils being made part of the rotor. The above description is intended in illustration and not in limitation of the invention. Various changes in the embodiments shown may occur to those skilled in the art and can be made without departing from the spirit or scope of the invention as set forth.

We claim:
1. A small commutatorless electric motor comprising a stator, a pair of elongated pancake-like coils symmetrically positioned in a plane perpendicular to an axis of rotation through said stator, a rotor mounted for rotation along said axis and having a balanced parallel pair of cross-arms of magnetic material establishing a strong magnetic field perpendicular to said coils, and means to derive a voltage from one of said coils and to apply a suitable drive current to the other coil, said coils being oval in shape with their ends opposite each other and their sides lying approximately along radii from said axis, said cross-arms on each of their outer ends carrying small block-like permanent magnets of high coercive force, said magnets passing closely adjacent said coils when said rotor is driven, return paths for the flux from said magnets being provided by said arms, one of said coils being narrower than the other, the opening in said coils being narrower than the ends of said cross arms.

2. A miniature electric motor of the character described, said motor comprising first and second parts including an armature and frame rotatably mounted relative to each other on said parts, said first part including a magnetic yoke positioned at right angles to said armature and having two outer ends defining respective air gaps traversed by strong magnetic fields, the field at one gap being in opposite direction from the field in the other gap, said yoke supplying a closed return path for said magnetic fields, said yoke comprising a pair of parallel magnetic beams mounted and balanced on said armature, the outer ends of said beams carrying small permanent magnets separated by said air gaps, the width of said coils being greater than the width of said permanent magnets, and a pair of pancake-like coils mounted on said second motor part for passage through said air gaps at substantially the same instants, one of said coils serving to supply an energizing pulse to drive said motor, the other coil serving to supply a control signal to a power supply for said motor.

3. A small commutatorless electric motor comprising a stator, at least one pair of elongated curved coils symmetrically positioned relative to an axis of rotation through said stator, a rotor mounted for rotation along said axis and having a balanced pair of cross-arms of magnetic material establishing a strong magnetic field perpendicular to said coils, and means to derive a voltage from one of said coils and to apply a suitable drive current to the other coil, said coils being curved in shape with their ends opposite each other and their edges lying approximately along radii from said axis, said cross-arms on each of their outer ends carrying small block-like permanent magnets of high coercive force, said magnets passing closely adjacent said coils when said rotor is driven, return paths for the flux from said magnets being provided by said arms, one of said coils being smaller than the other, the opening in said coils being narrower than the outer magnetic part of said cross-arms.

References Cited by the Examiner
UNITED STATES PATENTS

| | | | |
|---|---|---|---|
| 2,916,641 | 12/59 | Held | 310—39 |
| 2,929,008 | 3/60 | Wilcox | 318—254 X |
| 3,010,037 | 11/61 | Van Horn | 310—39 |
| 3,118,076 | 1/64 | Held | 310—39 |

FOREIGN PATENTS

| | | |
|---|---|---|
| 65,772 | 11/55 | France. |
| 321,957 | 7/57 | Switzerland. |
| 327,359 | 3/58 | Switzerland. |
| 327,805 | 3/58 | Switzerland. |
| 1,224,395 | 2/60 | France. |

MILTON O. HIRSHFIELD, *Primary Examiner.*

ORIS L. RADER, DAVID X. SLINEY, *Examiners.*